May 19, 1953 — W. J. PANKUCH ET AL — 2,638,881
TEMPERATURE CONTROL OF ENGINE COOLING
Filed Jan. 26, 1951 — 2 Sheets-Sheet 1
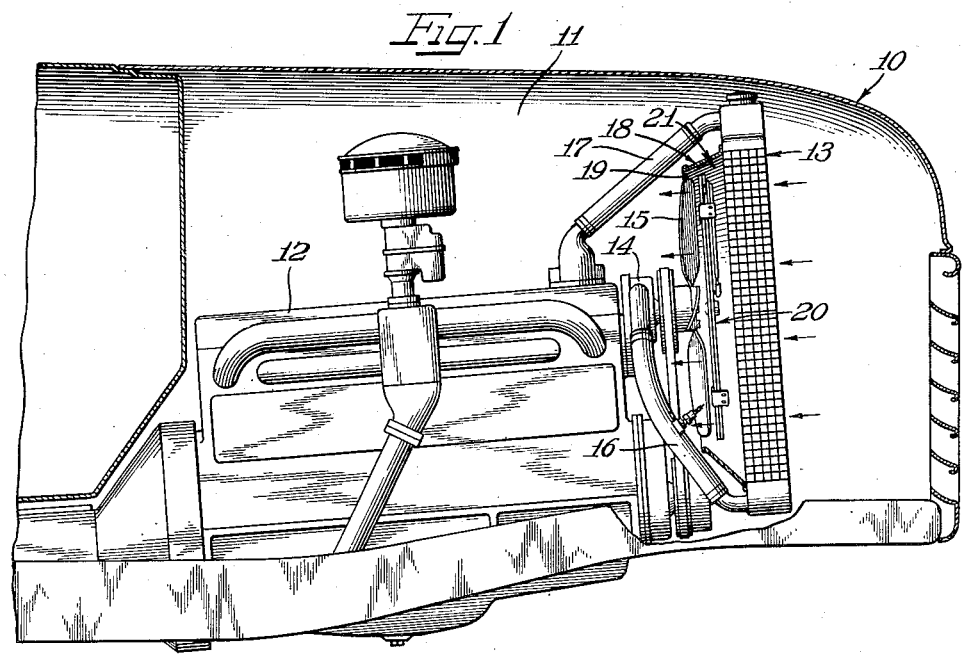
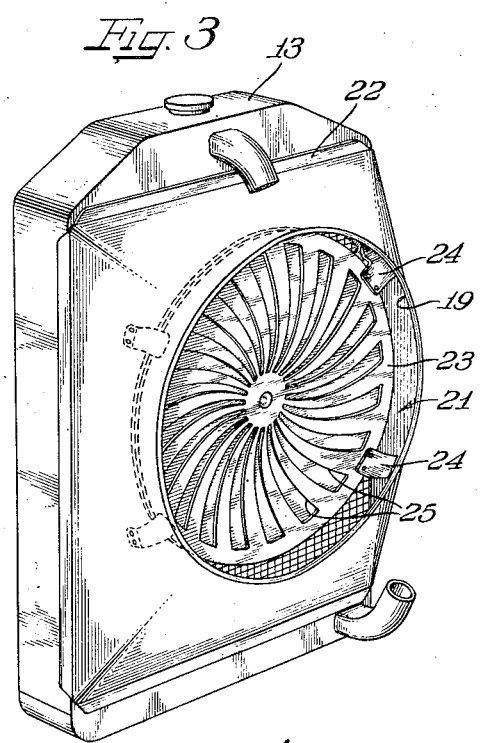
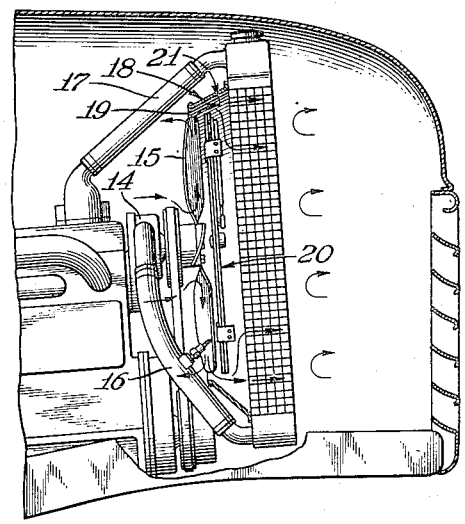
Inventors
William J. Pankuch
William S. Gleeson

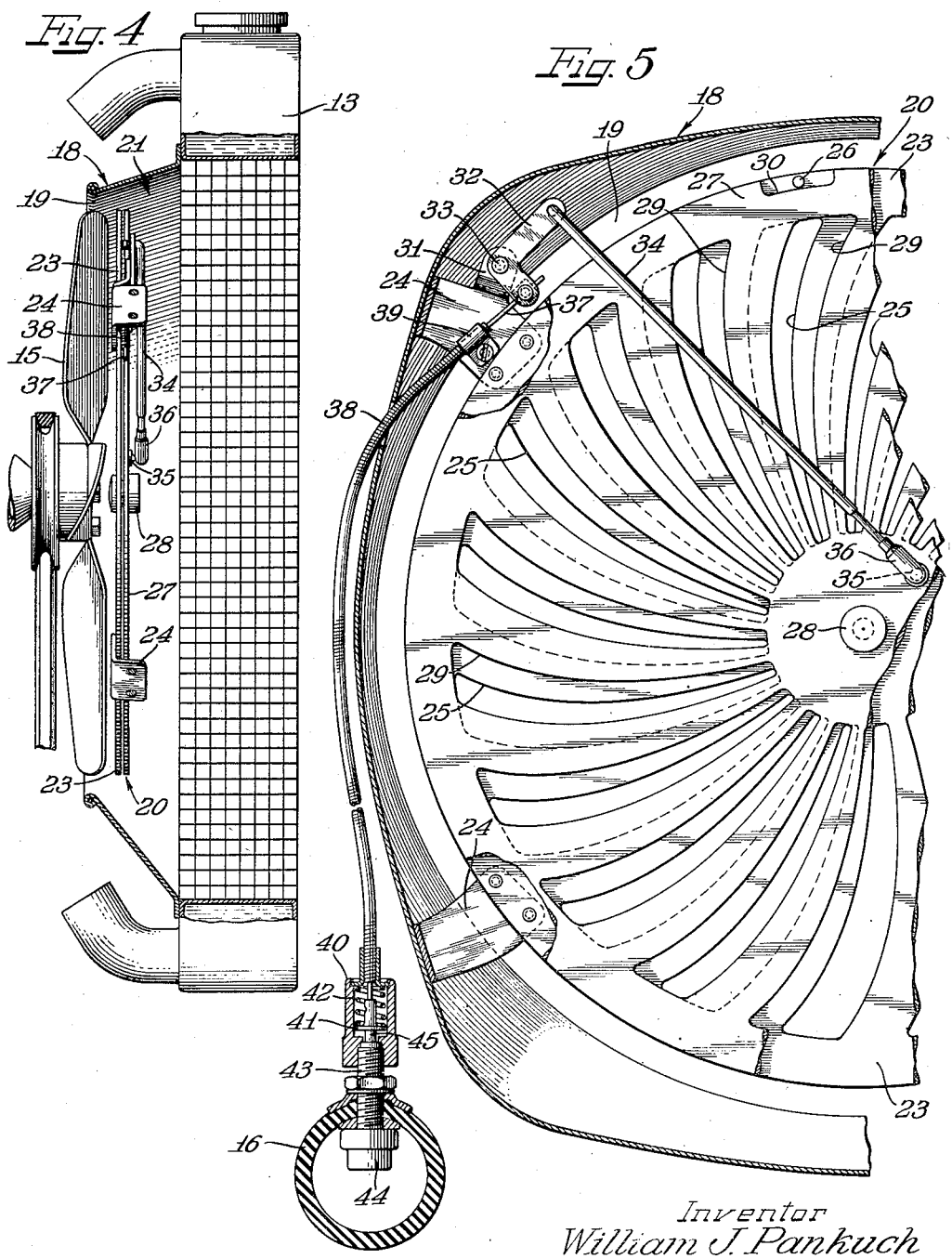

Patented May 19, 1953

2,638,881

UNITED STATES PATENT OFFICE 2,638,881

TEMPERATURE CONTROL OF ENGINE COOLING

William J. Pankuch and William S. Gleeson, Cleveland, Ohio, assignors to Thompson Products, Inc., Cleveland, Ohio, a corporation of Ohio Application January 26, 1951, Serial No. 208,007

8 Claims. (Cl. 123—41.05)

This invention relates to the control of engine temperatures by a fan and shutter assembly effecting an axial air flow when the engine is above a predetermined temperature and a radial air flow when the engine is below said temperature.

Specifically, the invention deals with a radiator shroud, shutter, and fan assembly especially adapted for liquid cooled engines to decrease the engine warming up period and to maintain engine temperatures within a narrow range.

In accordance with this invention, the radiator of a liquid cooled engine is equipped with a shroud or sleeve having a preferably circular mouth receiving the engine fan. A shutter assembly is mounted in the shroud closely adjacent the face of the fan. The periphery of the fan and the periphery of the shutter assembly are spaced from the shroud or are apertured so as to provide a passageway or gap for free flow of air around the fan and shutter combination. The shutter assembly includes a fixed perforated disk or plate immediately adjacent the axial air inlet face of the fan and a rotatable or rockable coacting perforated disk or plate between the radiator and the stationary plate in close proximity to the stationary plate. When the perforations of the two plates are registered, the shutter is open for axial flow of air through the shroud and shutter. In this open condition of the shutter, the fan operates to pull air axially through the radiator and shroud and discharge the air toward the engine. When the shutter assembly is closed, the fan operates to radially discharge air from the engine compartment into the shroud, whereupon the shroud will direct this flowing stream of air back through the radiator. This reversed air and the closed shutter prevents or hinders flow of ram air through the radiator to the fan. The reverse air flow increases the static pressure in the shroud and radiator core, restricting the passage of ram air through the core and actually carrying engine heat to the core. As a result of the reverse flow, the coolant temperatures are quickly raised. An automatic shutter control is provided to open and close the movable shutter plate in response to temperature of the engine cooling fluid.

A feature of the invention includes the blanketing of the radiator with warm air from the engine compartment when the shutter is closed.

Another feature of the invention resides in increasing the air flow through the radiator by a shroud between the radiator and fan in enveloping relation with the fan.

An important feature of the invention resides in the automatic conversion of axial air flow into radial air flow whenever the shutter of the assembly is closed.

It is, then, an object of this invention to provide a temperature control assembly for liquid cooled engines wherein the engine fan is automatically converted from an axial flow device to a radial flow device when engine temperature decreases below a specified minimum.

A further and important object of the invention resides in the provision of a shroud and shutter assembly for the fan and radiator combination of an internal combustion engine which assembly increases air flow through the radiator without increasing the horsepower requirements of the fan and converts the fan into a radial blower when the engine is below a predetermined temperature for blowing air from the engine compartment through the radiator to decrease the engine warming up period.

A still further object of the invention resides in the provision of a stationary shutter assembly in a shroud extending from an engine radiator around the engine fan, which shutter is effective to convert the engine fan from an axial flow device into a radial blower.

A specific object of the invention is to provide a stationary shutter assembly in a shroud for an engine radiator and to so space the shroud from the engine fan and shutter that an annular gap surrounds the fan and shutter assembly to direct warm air from the engine compartment back through the radiator when the shutter is closed.

Other and further objects of the invention will be apparent to those skilled in the art from the following detailed description of the annexed sheets of drawings which, by way of a preferred example only, illustrate one embodiment of the invention.

On the drawings:

Figure 1 is a side view of the motor compartment of an automotive vehicle equipped with a temperature control assembly of this invention and showing the path of the air flow when the assembly is in its open condition.

Figure 2 is a fragmentary view similar to Figure 1 but showing the path of the air flow when the assembly is in its closed condition.

Figure 3 is a perspective view of the engine radiator especially illustrating the air directing shroud and fixed shutter plate of this invention.

Figure 4 is an enlarged vertical cross-sectional view, with parts in side elevation, of the radiator shroud, shutter, and fan combination of this invention.

Figure 5 is a fragmentary inside face view of the shroud and shutter assembly illustrating the manner in which the movable plate of the shutter is automatically shifted in response to temperature of the cooling liquid for the engine.

As shown on the drawings:

In Figures 1 and 2, the reference numeral 10 designates generally the front end of an automotive vehicle having an engine compartment 11 containing the internal combustion engine 12 and a radiator 13 for the liquid cooling system of the engine. The engine 12 drives a conventional water pump 14 and fan 15. The pump 14 has its inlet connected through a hose 16 with the bottom of the radiator. Hot water from the engine circulates through a hose 17 into the top of the radiator.

In accordance with this invention, a shroud or sleeve 18 is mounted on the radiator 13 and converges therefrom to an open mouth 19 receiving the fan 15 therein. A shutter assembly 20 is mounted in the shroud 18 between the radiator 13 and fan 15 in closely spaced relation with the inlet face of the fan. The shutter is controlled by the temperature of the incoming coolant flowing to the pump 14 from the bottom of the radiator.

When the coolant flowing to the pump 14 is above a predetermined temperature, the shutter assembly 20 is open and air will flow axially through the radiator 13 under the axial pull of the fan 15. The flow of air through the radiator is, of course, assisted by the forward motion of the vehicle 10, which produces a ram air effect on the radiator, since the front of the compartment 11 is open to the front end of the vehicle.

When the temperature of the coolant flowing to the pump 14 is below a predetermined temperature, the shutter 20 is closed and effectively blocks the passage of ram air through the radiator 13 as indicated in Figure 2. In addition, the fan 15 in the mouth 19 of the shroud thereupon acts as a centrifugal blower to circulate warm air from the engine compartment 11 through the shroud and through a passageway or gap 21 between the shroud and shutter for outward flow through the radiator 13 thereupon having a warming effect upon the coolant in the radiator.

As best shown in Figure 3, the shroud 18 has an outside periphery 22 shaped to fit the radiator 13 and surround the inner face of the radiator core. The illustrated shroud 18 has a rectangular outer periphery converging inwardly to the circular mouth 19. A stationary shutter plate 23 is mounted in the shroud on straps or brackets 24 which hold the plate 23 just inside the mouth 19 in spaced concentric relation with the surrounding peripheral wall of the shroud, so that the path 21 between the shutter plate and the shroud is unobstructed except for the relatively narrow straps. As illustrated, the plate 23 is circular to conform with the circular mouth 19.

The plate 23 has a plurality of ports or openings 25 extending substantially radially from the center portion of the plate and terminating inwardly from the periphery of the plate. These openings or ports 25 are slightly curved in fan rotation direction and increase in width as they approach the outer periphery of the plate 23. A stop pin 26 is mounted on the plate 23 near the outer periphery thereof and projects therefrom in a direction toward the fan.

As best shown in Figures 4 and 5, the shutter assembly 20 also includes a rotatable plate 27 mounted on a stud 28 carried by the center of the stationary plate 23. This rotatable plate 27 closely confronts the plate 23 on the radiator side of the plate. The plate 27 is spaced inward from the shroud 18, so that the passage 21 is kept open.

As shown in Figure 5, the plate 27 has radially extending ports or openings 29 adapted to mate with the openings or ports 25 of the plate 23 or to be out of phase with these ports in the closed position of the shutter.

A recess 30 is provided in the periphery of the plate 27 to receive the pin 26 for limiting the extent of movement of the plate 27 relative to the plate 26.

One of the straps 24 for the fixed shutter plate 23 has an ear 31 thereon tiltably mounting a bell crank 32 having a pivot 33 between its legs. A rod 34 extends from one leg of the bell crank to the central portion of the movable shutter plate 27. A stud 35 on the plate spaced radially outwardly from the stud 28 is pivotally seated in a socket 36 on the end of the rod 34.

The other leg of the bell crank 32 has a Bowden wire 37 secured thereon. The wire extends through a Bowden cable 38 having one end anchored in a clamp 39 on the strap 24 and the other end anchored to a head 40. A plunger disk 41 is slidably mounted in the head and is urged by a spring 42 to the inner end of the head into spaced relation from the end on which the cable is anchored. The Bowden wire 37 is connected to this plunger 41 and the spring 42 is thereby effective to draw the Bowden wire into the head.

The bottom hose 16 connecting the bottom of the radiator and the inlet of the pump has a stud coupling 43 secured therein with the outer end of the stud threadingly engaged in the head 40 and with the inner end of the stud carrying a "Vernatherm" unit 44 in the hose. This "Vernatherm" unit contains a substance which expands under the influence of heat to push a pin 45 outwardly through the coupling 43 for acting against the plunger 41 in opposition to the spring 42. Compression of the spring 42 permits shifting of the Bowden wire in a direction to rock the bell crank 32 for pulling the rod 34 to rotate the shutter plate 27 for placing the ports 29 thereof in registration with the ports 25 of the stationary shutter plate 23. Conversely, expansion of the spring 42 pulls the Bowden wire 37 to rock the bell crank 32 in the opposite direction for pushing the rod 34 to rotate the plate 27 to place the ports 29 thereof out of registration with the ports 25.

If desired, the specifically illustrated shutter arrangement could be replaced with other types of shutters, such as arrangements with small doors each closing one of the ports of a multiported plate; arrangements using two rotatable plates movable in opposite directions to control the ports therein; and the like. A modulating shutter control for partially opening or closing the shutters could be used if desired. The shutter control could also be made sensitive to engine head temperatures or any other engine influenced temperature.

Operation

When the automobile engine 12 is operating under normal conditions, so that the liquid coolant is above a predetermined minimum temperature, the "Vernatherm" element 44 in intimate contact with the coolant flowing from the bottom of the radiator into the engine pump 14 will be at or above the predetermined minimum temperature and will cause the material in the "Vernatherm" element 44 to expand. Expansion of this material raises the pin 45 to push the Bowden wire 37 in a direction for rocking the bell crank 32 to open the shutter. Opening of the shutter occurs when the ports 29 of the plate 27 are in registration with the ports 25 of the plate 23. Partial opening of the shutter occurs when the ports of the two shutter plates are in partial registration, and such condition could obtain by providing a "Vernatherm" element which will partially shift as it approaches the minimum temperature desired for the coolant liquid entering the engine pump. For quick full opening and full closing, the "Vernatherm" unit can be such as to quickly expand when the minimum opening temperature is reached, and to quickly contract when the coolant falls below this temperature, thereby allowing the spring 42 to snap the shutter closed. Positive full opening and closing controls, or partial opening and partial closing modulating controls of the shutter are therefore provided.

Under open shutter conditions, the air flow into the compartment 11 will be as indicated by the arrows in Figure 1, wherein the fan 15 acts as an axial flow device and coacts with the ram air entering the radiator due to the forward motion of the vehicle for producing an axial stream of cooling air through the radiator. This cooling air enters the shroud after passage through the radiator core and passes freely through and around the open shutter to the fan. The air flowing capacity of the assembly is increased over 10% by the addition of the shroud without increasing the driving force for the fan.

When the engine temperature drops, or when a cold engine is being started, the air flow conditions illustrated in Figure 2 are created by the assembly of this invention. In such circumstances, the temperature of the cooling liquid surrounding the "Vernatherm" element 44 is below the predetermined minimum temperature desired for engine operation and the material in the "Vernatherm" element will contract to pull the pin 45 into the element, thereupon allowing the spring 42 to expand and pull the Bowden wire 37 in a direction for rocking the bell crank 32 to push the rod 34 for placing the ports 29 of the plate 27 out of registration with the ports 25 of the plate 23. Under these conditions, the shutter becomes a solid baffle confronting the inlet face of the fan 15 and also blocking ram air attempting to pass through the radiator core 13. The fan 15 is thereupon automatically converted from an axial air propelling device to a radial air blowing device as shown in Figure 2.

Since the periphery of the fan 15 lies in the mouth 19 of the shroud, and since a passageway is provided in the shroud around the periphery of the shutter, air from the motor compartment 11 will be radially discharged by the fan with some of the radial discharge flowing forward through the radiator core while the remainder is directed back into the engine compartment. The closed shutter blocks off flow of ram air through the radiator and the reverse air flow into the shroud from the engine compartment builds up a static pressure in the shroud which is only vented through the radiator core. The radiator core is thereupon warmed by the warm air in the engine compartment and the coolant entering the top of the radiator through the hose connection 17 will not be cooled as it flows down through the radiator. Some warming effect of the coolant flowing through the radiator may occur if the temperature of the coolant is quite low. In any event, the engine 12 is quickly brought up to proper operating temperatures, thereby materially decreasing the warming up period for the engine.

As soon as proper operating temperatures for the coolant liquid are maintained, the "Vernatherm" element will open the shutter and the air flow conditions illustrated in Figure 1 will be created.

It should be understood that while the shutter is illustrated as being mounted in spaced concentric relation with the shroud, the stationary shutter plate could be rigidly affixed around its periphery to the shroud as long as it is equipped with apertures affording passage of air back through the radiator when the shutter is closed to create the air flow conditions of Figure 2.

The device of this invention can be manually controlled if desired by connecting the Bowden wire 37 to a push-pull plunger mounted on the dash of the automotive vehicle instead of having the wire connected to the "Vernatherm" element.

The stop pin 26 in the recess 30 limits movement of the shutter plate 27 to an arc which is just sufficient to place the ports 29 into full registration with the ports 25 and to place the ports 29 out of registration with the ports 25 into alignment with the solid face portions of the plate 23 between the ports 25 thereof so as to prevent flow through the shutter.

From the above description it will therefore be understood that this invention provides a shroud and shutter arrangement for the radiator and fan of a liquid cooled internal combustion engine which increases the cooling capacity of the engine coolant system without increasing the driving power required for the fan, maintains the engine within a narrower range of operating temperatures, and decreases the engine warming up period. The shutter and shroud assembly of this invention is effective to convert the axial flow fan of a standard liquid cooled engine into a radial blower for circulating warm air surrounding the engine back through the radiator to quickly bring the coolant of the engine up to operating temperatures.

It will be understood that modifications and variations may be effected without departing from the scope of the novel concepts of the present invention.

We claim as our invention:

1. In combination with the fan and radiator assembly of a liquid cooled internal combustion engine, a shroud extending from the radiator into spaced surrounding relation with the fan, a stationary shutter part in the shroud confronting the inlet face of the fan in closely spaced relation therewith, a movable shutter part in the shroud in closely spaced confronting relation with the stationary part, said shutter parts coacting with said shroud to provide a passageway in the shroud communicating with the periphery of the fan even when the shutter is in closed position, and means for shifting the movable shutter part relative to the stationary shutter part for opening and closing the shutter, whereupon in the open position of the shutter air will flow axially through the radiator, the shroud and the fan, and in the closed position of the shutter air will flow radially from the fan through the passageway past the shutter into the radiator.

2. In combination with the fan and radiator assembly of a liquid cooled internal combustion engine, a shroud extending between the periphery of the radiator and the periphery of the fan for directing air therebetween, a stationary shutter part mounted in said shroud between the fan and radiator, a movable shutter part coacting with said stationary part, means for shifting the movable part relative to the stationary part for opening and closing the shutter, and means affording a passageway from the periphery of the fan through the shroud when the shutter is closed for circulation of air back through the radiator.

3. In combination with the fan and radiator assembly of a liquid cooled internal combustion engine, a shroud having a mouth surrounding the fan in spaced relation from the periphery of the fan, said shroud extending from said mouth to the outer peripheral portions of the radiator for directing air flow between the radiator and mouth, a shutter carried by said shroud between the fan and radiator, means for opening and closing said shutter, and means providing a passageway from the periphery of the fan through the shroud even when the shutter is closed, whereby closing of the shutter causes the fan to perform as a radial blower to propel air from the mouth of the shroud through said passageway to the radiator.

4. In combination with the fan and radiator assembly of a liquid cooled internal combustion engine, a shroud having a mouth surrounding the fan in spaced relation from the periphery of the fan and extending to the outer portions of the inner face of the radiator, a stationary shutter plate mounted in said shroud in closely spaced confronting relation with the inlet face of the fan, a movable shutter plate rotatably mounted on the stationary shutter plate on the side of the stationary shutter plate facing the radiator, said shutter plates having ports therein adapted to be placed into and out of registration, means providing a passageway from the periphery of the fan around the shutter in the shroud, and means controlled by temperature of the engine coolant liquid for opening and closing the shutter.

5. Temperature control apparatus for a fan and radiator assembly which comprises a shroud having a mouth surrounding the periphery of the fan and extending therefrom to the outer portions of the radiator, a stationary ported plate mounted in said shroud in close confronting relation with the side of the fan facing the radiator, a movable ported shutter plate rotatably mounted on the stationary plate and coacting therewith, a bell crank pivotally mounted in the shroud adjacent the outer periphery of the movable plate, a rod connecting one leg of the bell crank with the movable plate in spaced relation from the radial center of the plate, a Bowden wire connected to the other leg of the bell crank, and means for shifting said Bowden wire to rock the bell crank for pushing and pulling the rod to rotate the movable shutter plate for selectively positioning the ports thereof into and out of registration with the ports in the stationary plate.

6. In combination a radiator adapted to receive air therethrough, a bladed fan axially spaced from the radiator to flow air through the radiator, a sleeve having one open end secured to the outer peripheral portion of the radiator and the other open end receiving at least a portion of the fan blades therein, a shutter mounted in the sleeve between the fan and radiator, said shutter having an open position for axial flow of air through the radiator and fan and a closed position for blocking said axial flow, means providing a passageway through the shroud even when the shutter is closed, and the blades of said fan being arranged to propel air from said other open end of the shroud through said passageway to the radiator when said shutter is closed.

7. In combination with a radiator and fan assembly of a heat engine, a shroud between the radiator and fan, a shutter in the shroud between the radiator and fan, heat sensitive means controlling the shutter, means providing an air flow passage between the fan and radiator irrespective of the open or closed condition of the shutter and said fan being effective to force air through said passage back to the radiator when the shutter is closed and to pull air through the radiator and shroud when the shutter is open.

8. In an assembly for controlling air flow in a fan and radiator assembly of a liquid cooled internal combustion engine, a shroud, a shutter assembly mounted within said shroud and actuatable between an open position permitting air flow therethrough and a closed position substantially blocking air flow therethrough, said shroud being arranged for disposition between the radiator and the fan with said shutter assembly in spaced confronting relation to the inlet face of the fan, and means providing an air flow passageway from the periphery of the fan to said radiator irrespective of the open or closed condition of said shutter assembly.

WILLIAM J. PANKUCH.
WILLIAM S. GLEESON.

References Cited in the file of this patent

UNITED STATES PATENTS

| Number | Name | Date |
|---|---|---|
| 957,776 | Ilg | May 10, 1910 |
| 1,331,100 | Fulton | Feb. 17, 1920 |
| 1,339,435 | Lapsley | Dec. 6, 1921 |
| 1,550,417 | Barling | Aug. 18, 1925 |
| 1,573,641 | Hunt | Feb. 16, 1926 |
| 1,903,134 | Ream | Mar. 28, 1933 |
| 2,351,203 | Hanson | June 13, 1944 |
| 2,446,879 | Kennedy | Aug. 10, 1948 |

FOREIGN PATENTS

| Number | Country | Date |
|---|---|---|
| 248,926 | Switzerland | Mar. 1, 1948 |